United States Patent
Bhattacharya et al.

(10) Patent No.: US 11,790,172 B2
(45) Date of Patent: Oct. 17, 2023

(54) SYSTEMS AND METHODS FOR IDENTIFYING ENTITIES AND CONSTRAINTS IN NATURAL LANGUAGE INPUT

(71) Applicant: Microsoft Technology Licensing, LLC, Redmond, WA (US)

(72) Inventors: Pamela Bhattacharya, Redmond, WA (US); Barun Patra, Redmond, WA (US); Chala Fekadu Fufa, Redmond, WA (US); Charles Yin-Che Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 365 days.

(21) Appl. No.: 17/025,557

(22) Filed: Sep. 18, 2020

(65) Prior Publication Data

US 2022/0092265 A1    Mar. 24, 2022

(51) Int. Cl.
*G06F 40/295* (2020.01)
*G06F 40/284* (2020.01)
*G06F 40/117* (2020.01)
*G06F 40/30* (2020.01)

(52) U.S. Cl.
CPC .......... *G06F 40/295* (2020.01); *G06F 40/117* (2020.01); *G06F 40/284* (2020.01); *G06F 40/30* (2020.01)

(58) Field of Classification Search
None
See application file for complete search history.

(56) References Cited

U.S. PATENT DOCUMENTS

| 8,788,263 B1 | 7/2014 | Richfield |
| 8,832,205 B2 | 9/2014 | Nelson et al. |
| 9,152,623 B2 | 10/2015 | Wroczy ski et al. |
| 9,672,827 B1 * | 6/2017 | Jheeta ................... G06F 16/338 |

(Continued)

FOREIGN PATENT DOCUMENTS

WO    03088080 A1    10/2003

OTHER PUBLICATIONS

Shen et al. "ReasoNet: Learning to Stop Reading in Machine Comprehension". KDD'17, Aug. 13-17, 2017, Halifax, NS, Canada, pp. 1047-1055 (Year: 2017).*

(Continued)

*Primary Examiner* — Jesse S Pullias

(57) ABSTRACT

The disclosure relates to systems and methods for identifying entities related to a task in a natural language input. An entity detection model is provided which receives a natural language input. The entity detection model processes the natural language input using an entity encoder and an input encoder. The entity encoder identifies and encodes relevant entities while the input encoder generates a contextual encoding which represents contextual information associated with a relevant entity. The encoded entity and contextual encodings may then be combined and processed to generate a probability score for an identified entity. A negation constraint model is also disclosed. The negation constraint model receives the natural language input and the identified entities. The natural language input is analyzed to identify negation cues and determine if the negation cue is associated with an identified entity.

20 Claims, 10 Drawing Sheets

(56) References Cited

U.S. PATENT DOCUMENTS

| | | | |
|---|---|---|---|
| 9,697,475 B1* | 7/2017 | Subramanya | G06N 7/01 |
| 9,836,453 B2 | 12/2017 | Radford et al. | |
| 9,852,136 B2 | 12/2017 | Venkataraman et al. | |
| 10,380,236 B1* | 8/2019 | Ganu | G06F 40/289 |
| 11,295,083 B1* | 4/2022 | Yun | G06N 3/08 |
| 11,442,992 B1* | 9/2022 | Moon | G06N 20/00 |
| 2009/0089045 A1 | 4/2009 | Lenat et al. | |
| 2015/0066479 A1 | 3/2015 | Pasupalak et al. | |
| 2016/0055246 A1 | 2/2016 | Marcin et al. | |
| 2016/0307567 A1* | 10/2016 | Boies | G10L 15/183 |
| 2017/0032257 A1* | 2/2017 | Sharifi | G06F 3/0481 |
| 2018/0121413 A1* | 5/2018 | Warren | G06F 40/295 |
| 2018/0189269 A1* | 7/2018 | Quirk | G06F 40/289 |
| 2018/0300608 A1* | 10/2018 | Sevrens | G06N 3/0445 |
| 2019/0065460 A1* | 2/2019 | Xin | G06F 40/295 |
| 2020/0302118 A1* | 9/2020 | Cheng | G06F 40/295 |

OTHER PUBLICATIONS

"International Search Report and Written Opinion Issued in PCT Application No. PCT/US2021/035565", dated Sep. 20, 2021, 10 Pages.

"Natural Language API Basics", Retrieved From https://web.archive.org/web/20200417231146/https:/cloud.google.com/natural-language/docs/basics, Apr. 17, 2020, 24 Pages.

Angeli, et al., "Language Independent Discriminative Parsing of Temporal Expressions", In Proceedings of the Conference of the North American Chapter of the Association for Computational Linguistics, Aug. 2013, pp. 83-92.

Angeli, et al., "Parsing Time: Learning to Interpret Time Expressions", In Proceedings of the Conference of the North American Chapter of the Association for Computational Linguistics: Human Language Technologies, Jun. 3, 2012, 10 Pages.

Bahdanau, et al., "Neural Machine Translation by Jointly Learning to Align and Translate", In Proceedings of 3rd International Conference on Learning Representations, May 7, 2015, 15 Pages.

Bethard, Steven, "Cleartk-Timeml: A Minimalist Approach to Tempeval", In Proceedings of the 7th International Workshop on Semantic Evaluation, Jun. 14, 2013, pp. 10-14.

Blamey, et al., "The First Day of Summer: Parsing Temporal Expressions With Distributed Semantics", In International Conference on Innovative Techniques and Applications of Artificial Intelligence, Dec. 10, 2013, pp. 389-402.

Buitinck, et al., "API Design for Machine Learning Software: Experiences From the Scikit-Learn Project", In Journal of Computing Research Repository, Sep. 2013, 15 Pages.

Chang, et al., "Sutime: A Library for Recognizing and Normalizing Time Expressions", In Proceedings of the Eighth International Conference on Language Resources and Evaluation, May 23, 2012, 6 Pages.

Fancellu, et al., "Neural Networks for Negation Scope Detection", In Proceedings of the 54th annual meeting of the Association for Computational Linguistics, vol. 1, Aug. 7, 2016, pp. 495-504.

Filannino, et al., "Mantime: Temporal Expression Identification and Normalization in the Tempeval-3 Challenge", In Proceedings of the 7th International Workshop on Semantic Evaluation, 5 Pages, Apr. 30, 2013.

Gardner, et al., "Allennlp: A Deep Semantic Natural Language Processing Platform", In Journal of Computing Research Repository, Mar. 2018, 6 Pages.

Gehrmann, et al., "Bottom-Up Abstractive Summarization", In Proceedings of the Conference on Empirical Methods in Natural Language Processing, Aug. 31, 2018, 12 Pages.

Lee, et al., "Context-Dependent Semantic Parsing for Time Expressions", In Proceedings of the 52nd Annual Meeting of the Association for Computational Linguistics, Jun. 23, 2014, pp. 1437 1447.

Li, et al., "Improving Neural Abstractive Document Summarization With Explicit Information Selection Modeling", In Proceedings of the 2018 Conference on Empirical Methods in Natural Language Processing, Oct. 31, 2018, pp. 1787-1796.

Llorens, et al., "Tipsem (English and Spanish): Evaluating Crfs and Semantic Roles in Tempeval-2", In Proceedings of the 5th International Workshop on Semantic Evaluation, Jul. 15, 2010, pp. 284-291.

Mani, et al., "Robust Temporal Processing of News", In Proceedings of the 38th Annual Meeting on Association for Computational Linguistics, Oct. 3, 2000, pp. 69-76.

Morante, et al., "C Onandoyle-Neg: Annotation of Negation in Conan Doyle Stories", In Proceedings of the Eighth International Conference on Language Resources and Evaluation, May 23, 2012, pp. 1563-1568.

Morante, et al., "Shared Task: Resolving the Scope and Focus of Negation", In Proceedings of the First Joint Conference on Lexical and Computational Semantics, Jun. 7, 2012, pp. 265-274.

Pustejovsky, et al., "The Timebank Corpus", In Journal of Corpus linguistics, vol. 2003, Mar. 28, 2003, pp. 647-656.

Bosenberg, Sabine, "Negation Triggers and Their Scope", In Ph.D. thesis, Concordia University, Sep. 2013, 128 Pages.

Ruder, Sebastian, "An Overview of Multi-Task Learning in Deep Neural Networks", In Journal of the Computing Research Repository, Jun. 2017, pp. 1-14.

Steedman, Mark, "Surface Structure and Interpretation", Published in MIT Press, 1996, 3 Pages.

Strotgen, et al., "Heideltime: High Quality Rule-Based Extraction and Normalization of Temporal Expressions", In Proceedings of the 5th International Workshop on Semantic Evaluation, Jul. 15, 2010, pp. 321-324.

Sutskever, et al., "Sequence to Sequence Learning With Neural Networks", In Journal of Advances in neural information processing systems, Dec. 8, 2014, pp. 1-9.

Uzzaman, et al., "Semeval—2013 Task 1: Tempeval-3: Evaluating Time Expressions, Events, and Temporal Relations", In Proceedings of the Seventh International Workshop on Semantic Evaluation, Jun. 14, 2013, 9 Pages.

Uzzaman, et al., "Trips and Trios System for Tempeval-2: Extracting Temporal Information From Text", In Proceedings of the 5th International Workshop on Semantic Evaluation, Jul. 15, 2010, pp. 276-283.

Verhagen, et al., "Automating Temporal Annotation With Tarsqi", In Proceedings of the ACL Interactive Poster and Demonstration Sessions, Jun. 2005, pp. 81-84.

Vig, et al., "Meeting Bot: Reinforcement Learning for Dialogue Based Meeting Scheduling", In Proceedings of the Workshops at the Thirty-Second AAAI Conference on Artificial Intelligence, Jun. 20, 2018, 7 Pages.

Williams, et al., "FAst and Easy Language Understanding for Dialog Systems With Microsoft Language Understanding Intelligent Service (LUIS)", In Proceedings of the 16th Annual Meeting of the Special Interest Group on Discourse and Dialogue, Sep. 2, 2015, pp. 159-161.

Zhong, et al., "Time Expression Analysis and Recognition Using Syntactic Token Types and General Heuristic Rules", In Proceedings of the 55th Annual Meeting of the Association for Computational Linguistics, Jul. 30, 2017, pp. 420-429.

Zhong, et al., "Time Expression Recognition Using a Constituent-Based Tagging Scheme", In Proceedings of the Conference on World Wide Web, Apr. 23, 2018, pp. 983-992.

Bahirwani, et al., "Example Based Entity Extraction, Slot Filling and Value Recommendation", Application as Filed in U.S. Appl. No. 16/543,794, filed Aug. 19, 2019, 53 Pages.

* cited by examiner

SYSTEMS AND METHODS FOR IDENTIFYING ENTITIES AND CONSTRAINTS IN NATURAL LANGUAGE INPUT

BACKGROUND

An increasing number of applications are designed to work via natural language interactions with users. As the prevalence of these applications grow, users expect the applications to correctly interpret the utterances and perform requested tasks. It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

The present disclosure provides systems and methods for identifying entities related to a task in a natural language input. In certain aspects, an entity detection model is provided which receives the natural language input, the entity detection model processes the natural language input using an entity encoder and an input encoder. The entity encoder identifies and encodes relevant entities in the natural language input. The input encoder may be used to generate a contextual encoding which represents contextual information associated with a relevant entity. The encoded entity and contextual encoding may then be combined and processed to generate a probability score for the identified entity.

Further aspects of the disclosure relate to a negation constraint model which receives the natural language input and one or more identified entities. The negation model analyzes the natural language input to identify negation cues. Upon identification of a negation que, the natural language input is parsed to determine a scope of the negation cue. The scope is analyze to determine whether the one or more entities fall within the scope. If an entity falls within the scope, the entity is tagged as negated.

Further aspects of the disclosure relate to an operable to use the entity and constraint detection processes disclosed herein to process natural language input and perform a task related to the natural language input. The identification of constraints allows the application to select the correct entities to use a parameters when completing a task in accordance with the received natural language input.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Figure 1:
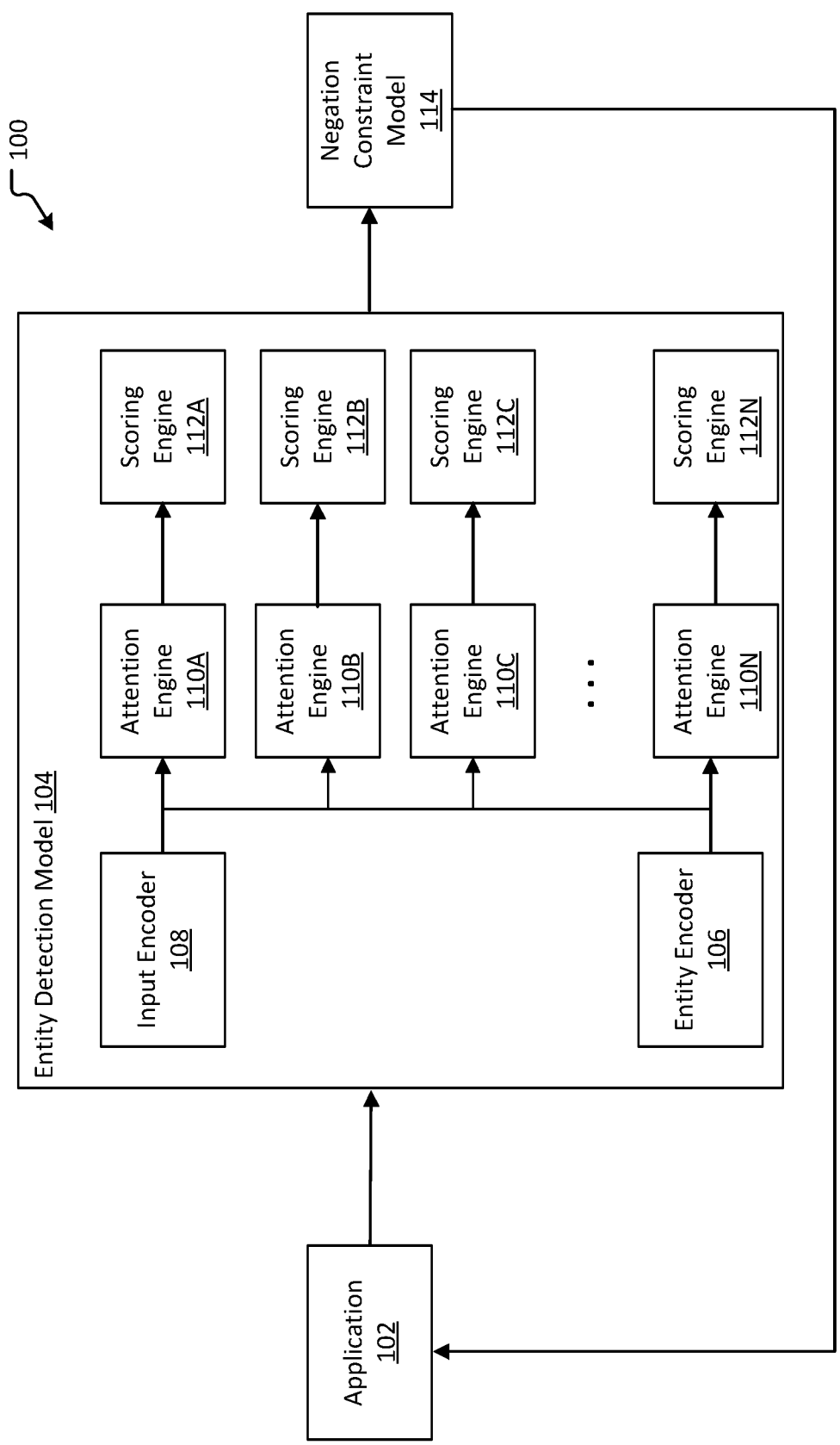
FIG. 1 is an exemplary system 100 for identifying entities and constraints in natural language input.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

There has been a great deal of investment in the field of natural language processing (NLP) in time entity recognition and normalization from text. There are, however, a growing number of NLP applications which require extraction of only a relevant subset of time entities to solving specific problems within a larger body of text. Examples of such applications include scheduling and productivity applications, personal digital assistants, file browsers, search engines, and the like. As an example, consider an email based digital assistants that accomplish particular tasks for their users such as scheduling meetings via email exchanges. A user desiring to organize a meeting would add the digital assistant as a recipient in an email with other attendees and delegate to the digital assistant the task of scheduling a meeting in natural language. For the digital assistant to accomplish the scheduling task, it must correctly extract the time related utterances the user expressed in the email to indicate what times work for them, as well as if there are times that do not work for them.

NLP solutions generally have a difficult time distinguishing between relevant task entities that are appropriate for performing a task and task entities that, while relevant to the task, are not appropriate for performing the task. Further, many NLP solutions fail to correctly identify relevant entities because they are either too focused on determining an entity or too focused on determining a context. Aspects disclosed herein address these issues and other by providing an entity detection model that identifies entities and determines their relevance using both entity detection based models, such as neural network models and non-neural network models (e.g., regex based detection), and contextual based neural network models. Further aspects disclosed herein provide a negative constraint model to determine whether any of the identified entities are associated with a negation cue in the natural language input. By determining if an entity has been negated, the aspects disclosed herein accurately identify entities relevant to task completion while disregarding entities that are not. Among other benefits, the systems and methods disclosed herein provide an enhanced user experience and conserve processing resources that would otherwise be consumed generating roundtrip dialogs with the user to confirm task parameters.

FIG. 1 is an exemplary system 100 for identifying entities and constraints in natural language input. The system 100 includes an application 102, an entity detection model 104, and a negative constraint model 114. While the system 100 illustrates a single instance of the application and models, one of skill in the art will appreciate that the aspects disclosed herein may be practiced using multiple applications and/or models. In various aspects, application 102, an entity detection model 104, and a negative constraint model 114 may reside on the same device or on different devices. In examples where the elements of system 100 reside on different devices (i.e., a distributed network, a client/server system, and the like), the elements may communicate with each other via a network (not shown), such as the Internet. In further examples, although system 100 depicts the application 102, entity detection model 104, and negative constraint model 114 as separate entities, one of skill in the art will appreciate that the aspects disclosed herein may be combined into fewer entities or separated into a greater number of entities. For example, entity detection model 104 and negative constraint model 114 may be a single entity. In alternate examples, entity detection model 104 and negative constraint model 114 may be part of application 102.

Application 102 may be any type of application operable to receive natural language input. The natural language input may be text or spoken input. In examples, Application 102 may be an email application, a scheduling application, personal digital assistant, a web browser, a search engine, a file browser, or any other type of application operable to perform a task in response to receiving natural language input. The natural language input may be received via an interface such as a keyboard, a microphone, etc. that is part of a device executing application 102 or in communication with application 102. The natural language input may be received by application 102 directly from a user or from another application or device in communication with application 102.

Upon receiving the natural language input, application 102 may provide the natural language input to entity detection model 104. In examples, entity detection model may be rule based, statistically learnt models (E.g., conditional random fields (CRFs), neural models, etc.), or a combination of both. Entity detection model 104 may be trained to identify specific types of entities. For example, entity detection model 104 may be trained to recognize date/times, locations, names, file types, or the like. One of skill in the art will appreciate that, although not shown, multiple entity detection models may be employed by system 100. In such examples, the different entity detection models may be trained to recognize different types of entities. Upon receiving the natural language input, the system 100 may process the input to determine which entity detection model 104 should receive the natural language input for processing. The determination may be based upon the type of application receiving the natural language input. For example, input received from a scheduling application may be provided to an entity detection model trained to detect dates and times, while input received by a file browser may be provided to an entity detection model trained to identify names or file types.

Upon receiving the natural language input, the entity detection model 104 processes the natural language input using entity encoder 106 and input encoder 108. In examples, entity encoder 106 may be any type of encoder trained to extract entities from natural language input. Various types of extraction techniques can be employed by entity encoder 106 such as, but not limited to rule-based tagging, named-entity recognition, text summarization, aspect mining, topic modeling, or any other type of entity extraction models or processes. One of skill in the art will appreciate that different types of entity extraction processes may be employed individually or in combination by entity extractor 106. In examples, entity encoder 106 identifies one or more entities in the natural language input and encodes the entities for further processing. Various type of encoding processes may be employed to encode the entities identified in the natural language input, such as a character encoder, a sequence-to-sequence encoder, or the like. As used herein, an encoding may be a numerical representation of an object and/or the object characteristics. For example, an encoding may be a vector that represents the entity and/or contextual information related to the entity in an N-dimensional vector space. In examples, entity encoder 106 may employ multiple types of encoders. For example, entity encoder 106 may employ a sequence-to-sequence encoder to extract and encode identified entities as well as a character encoder in order to extract entities that might have been missed, for example, using a rule-based encoder due to a misspelling or other type of error. Entity encoder 106 processes the natural language input to generate one or more entity encodings. The one or more entity encoding may then be provide to an attention engine 110. In examples, multiple attention engines, e.g., attention engines 110A, 110B, 110C, and 110N, may be part of entity detection model 104. For example, an individual attention engine 110 may be used for each entity identified by entity encoder 106. In alternate examples, a single attention engine 110 may be employed as part of entity detection model 104. As will be discussed in further detail, the one of more entity encodings may be used to predict whether an identified entity is relevant to the application task.

Figure 1A:
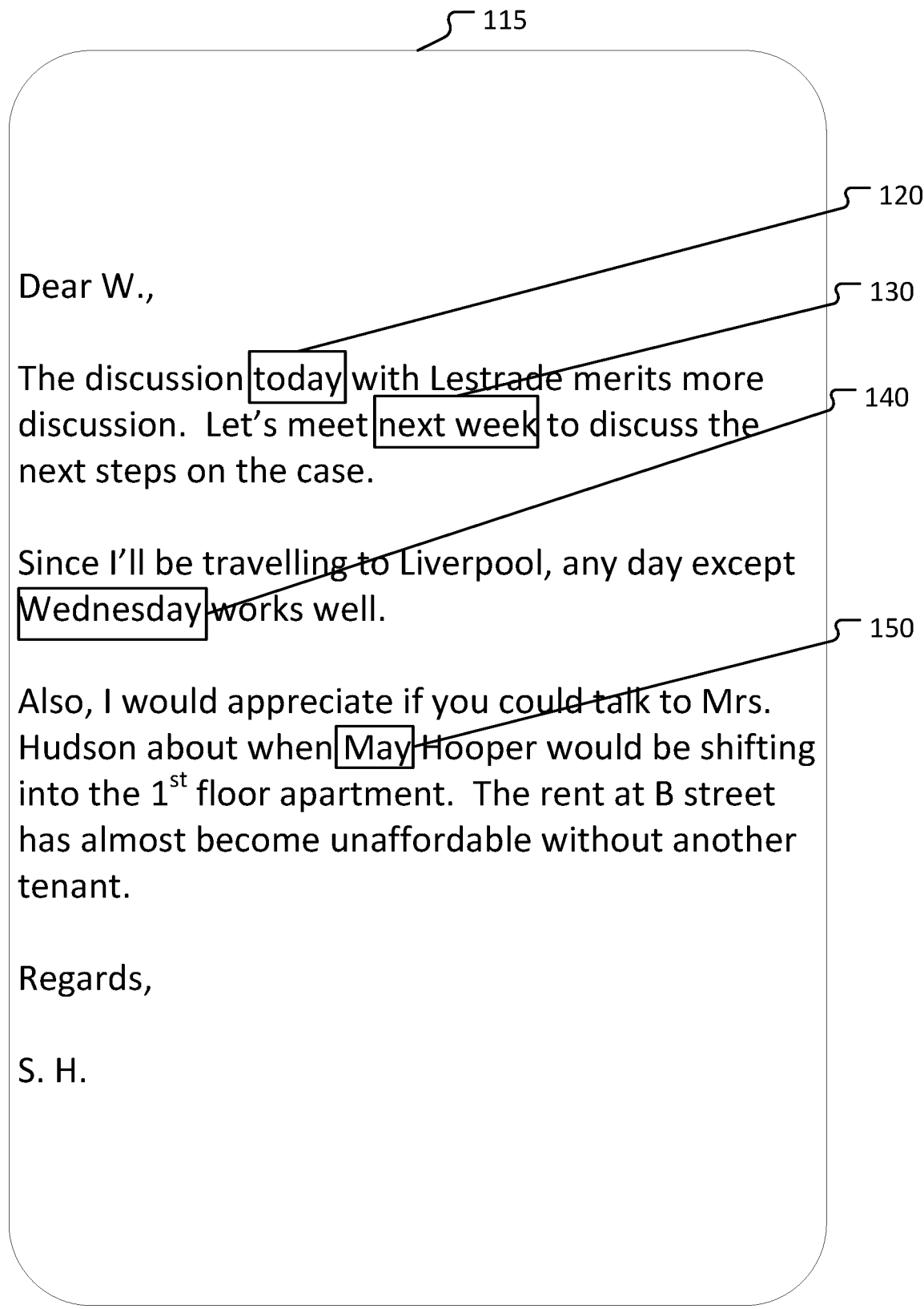
FIG. 1A depicts an exemplary natural language input.

For ease of explanation, an exemplary use of system 100 will be described with respect to scheduling a meeting between attendees. In this example, the natural language input may be an email requesting a meeting between the sender and the recipient. FIG. 1A depicts an exemplary natural language input, specifically, the content of email 115. An application, such as application 104 may receive email 115 and attempt to perform a task in response to receiving the email. In the depicted example, the task is scheduling a meeting between "W." and "S. H." Continuing with the example, email 115 may be provided to entity encoder 106 and input encoder 108. In the depicted example, entity encoder 106 may be an encoder trained to recognize dates and times. Entity encoder 106 may identify the following date/time entities in email 115: "today" 120, "next week" 130, "Wednesday" 140, and "May" 150.

As can be observed from the context of the content of email 115, the identified entities "today" 120 and "May" 150 are not relevant to the exemplary scheduling task. That is, in the depicted example, if a schedule attempted to schedule a meeting today or in May, the scheduler would not properly schedule a meeting. To avoid such mistakes, entity detection model 104 may also employ an input encoder 108 to identify and capture contextual information from the natural language input. Input encoder 108 processes the natural language input to identify and capture contextual information for the one or more entities identified by the entity encoder 106. In examples, input encoder may be a neural network or a machine learning process operable to identify contextual information, such as, but not limited to, a neural network, a convolutional neural network (CNN), a long short-term memory (LSTM) recurrent neural network (RNN), a transformer architecture, a deep averaging network, an orthonormal encoder, or the like. One of skill in the art will appreciate that input encoder 108 may be any type of contextual encoder known in the art. In examples, input encoder 108 processes the natural language input to generate one or more contextual encodings representing contextual information from the natural language input.

As noted above, the input encoder 108 processes the natural language input to identify and encode contextual information related to the entities identified by entity encoder 106. The contextual information encoded by input encoder 108 is provided to one or more attention engines 110A-N. In examples, contextual information identified by input encoder 108 relevant to a specific entity identified by the entity encoder 106 is provided to and processed by the same attention engine 110 as the specific encoder. The attention engine 110 receives an entity encoding from entity encoder 106 and contextual information from input encoder 108. The attention engine 110 processes the entity encoding and contextual information to generate a contextual entity encoding for one or more identified entities. That is, the attention mechanism processes the information received from entity encoder 106 and input encoder 108 to generate a single encoding. This may be accomplished by concatenating an entity encoding and the contextual encodings to generate a contextual entity encoding.

The one or more attention engines 110A-N employed by the entity detection model 104 may provide the contextual entity encodings to one or more scoring engines, such as scoring engines 112A-N. As discussed above with respect to attention engines 110A-N, one or more scoring engines 112A-N may be employed by the entity detection model 104. In one example, a separate scoring engine may be employed for an entity identified by entity encoder 106. Alternatively, a single scoring engine may be employed to generate a score for all identified entities. In examples, scoring engine 112A may generate a score representing the relevance of the identified entity to the application task. Entity detection model 104 may provide the one or more identified entities and their associated relevance score. In one example, entity detection model 104 provides each identified entity with a relevance score. Alternatively, entity detection model may provide only a subset of the identified entities, e.g., entities having a relevance score meeting or exceed a certain threshold value.

Entity detection model 104 provides improved task entity detection over prior solutions through a combination of neural network processing. The combined use of neural models for incorporating contextual information with neural models for entity detection leads to improved identification or relevant entities for processing a task. However, entity detection alone may not be sufficient to properly perform a task. Referring back to the example natural language processing input, email 115 of FIG. 1A, while "Wednesday" 140 is highly relevant to the exemplary scheduling application, scheduling a meeting on Wednesday leads to an unsatisfactory user experience as "S. H." is not available to meet on Wednesday. In order to improve task performance, entity detection model 104 provides one or more identified entities to negation constrain model 114.

In examples, in addition to receiving the identified entities output by entity detection model 104, negation model 114 may also receive the natural language input. Negation constrain model processes the natural language input to identify negating cues. For example, a negating cue may be natural language that negates the use of an entity for performing a task. Exemplary negation cues include, but are not limited to, words such as "not," "never," "neither," "nor," "no," "nothing," "nobody," "instead of," "without," "rather than," "failed to," "avoid," "other than," "unable," "negative," "except," "none," and/or words ending with the contraction "n't." One of skill in the art will appreciate that, while specific negation cues are described herein, the specific negation cues are provided for exemplary purposes and other types of negation cues may be identified by negation constraint model 114. Upon identifying one or more negation cues in the natural language input, negation constrain model determines a scope of the negation cue. In examples, the negation constraint model 114 may identify multiple scopes of different breadth for an identified negation cue. If an identified entity falls within one of the determined negation scope, negation constrain model 114 tags the identified entity to indicate negation of the entity. Negation constraint model 114 may then provide both the tagged and untagged entities, along with their relevance scores, to the application 102 for task performance. Application 102 may use the relevance scores and negation tags to identify relevant entities as task parameters. Although not shown, the output generated by the entity detection model 104, the negation constraint model 114, and/or information related to the task ultimately performed by the application 102 may be used to train the one or more models employed by entity detection model 104, such as, for example entity encoder 106 and/or input encoder 108, and/or the negation constraint model to improve future performance.

As should be appreciated, the various processes, components, attributes, input types, etc., described with respect to FIGS. 1 and 1A are not intended to limit the systems and methods to the particular attributes described. Accordingly, additional topology configurations may be used to practice the aspects disclosed herein and/or some attributes described may be excluded without departing from the methods and systems disclosed herein.

Figure 2:
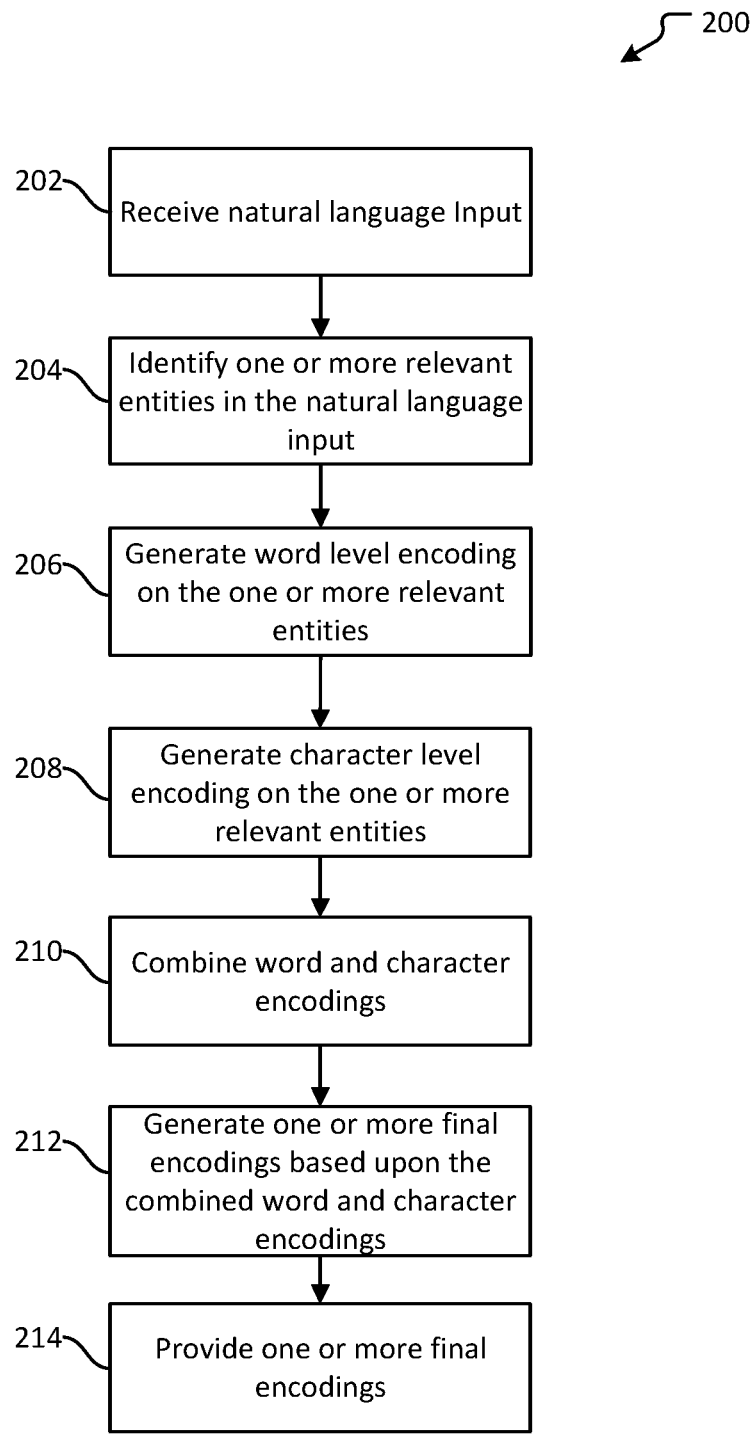
FIG. 2 depicts an exemplary method for generating one or more entity encodings.

FIG. 2 depicts an exemplary method 200 for generating one or more entity encodings. In certain aspects, the method 200 may be performed by an entity encoder, such as entity encoder 106 of FIG. 1. Processing begins at operation 202, where the method 200 receives natural language input. The natural language input received at operation 202 may be related to performance of a certain type of task. For example, the natural language input may be related to scheduling a meeting, performing a search, or any other type of task. Flow continues to operation 204 where the natural language input is processed to identify one or more relevant entities. As discussed above, a relevant entity may vary based upon the type or task to be performed. For example, if the task is related to scheduling a meeting, date/time entities may be relevant. If the task is related to a search, name entities or file type entities may be identified as relevant.

In examples, a rule-based tagger or other types of recall heavy process may be used to extract potential entities from the natural language input. In such an example, the natural language input may be processed to identify words known as being relevant to a particular task. Alternatively, as noted above, named-entity recognition, text summarization, aspect mining, topic modeling, or any other type of entity extraction model or process can be employed at operation 204 to identify one or more relevant entities.

Upon identifying one or more relevant entities, flow continues to operation 206 were word level encodings are generated for the one or more identified identities. Various different types of encodings may be employed to generate a vector or value representing the identified entity. In examples, the one or more identified entities may be processed using a sequence-to-sequence RNN to generate and output a vector or value representing the one or more identified entities. In further examples, entities may be represented by a previously learnt vector. Out-of-vocabulary (OOV) words representing entities, that is identified entities that were not previously processed by the encoder may share a common vector.

Flow then continues to operation 208 where the method 200 generates a character level encoding of the one or more identified entities. Generation of the character level encodings may be performed to augment the word level encodings. For example, character level encodings may be used to provide more information or allow the model to reason about OOV entities. Alternatively, character performing a character level encoding may provide other benefits, such as, for example, providing additional information about entities that are misspelled or contain some other type of error. One of skill in the art will appreciate that any type of character level encoder may be employed at operation 206 so long as the character level encoding is compatible or combinable with the previously generated word level encoding.

Once the work level encoding and character level encoding for the one or more entities have been generated, flow continues to operation 210 where the word and character encodings for an entity are combined. In one example, the word and character level encodings may be combined by concatenating the two encodings. A final encoding for an identified entity is generated at operation 212. A final encoding may be generated by passing the combined word and character level encodings through another sequence-to-sequence encoder. Alternatively, the word and character level encodings may be processed using other types of models or encoders in order to generate a single encoding for the identified entities. While a specific models and encoders are described herein, one of skill in the art will appreciate that any type of encoder or process may be used to generate a single encoding representing a combined encoding for the word level encoding generated at operation 206 and the character level encoding generated at operation 208.

As an example, a final encoding may be generated as follows. The one or more entities identified at operation 204 may be denoted as $E=\{e_1 \ldots e_n\}$, where $e_i=\{e_{i,1} \ldots e_{i,l_i}\}$ represents the $i^{th}$ entity and denotes the length of $e_i$. For each entity $e_i$ generate an embedding $u_{e_i} \in R^{d_e}$ where $d_e$ denotes the entity embedding dimension as the following:

$$t_{i,j} = LookUp\ (e_{i,j})$$

$$r_{i,j} = CharEncoder(e_{i,j})$$

$$h_{i,j} = [r_{i,j}; t_{i,j}]$$

$$u_{e_i} = Seq2SeqEncoder(h_{i,1} \ldots h_{i,l_i})$$

In the example, $t_{i,j}$ denotes the word level embedding of the $j^{th}$ word of the $i^{th}$ entity ($e_{i,j}$). While specific examples for generating a final encodings for one or more identified entities have been described herein, one of skill in the art will appreciate that these encodings have been provided as an example. Other processes for generating a final encoding may be performed at operation 212 without departing from the scope of this disclosure. Upon generating final encodings for the one or more identified entities, the final encodings may be provided at operation 214.

As should be appreciated, the operations of the method 200 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Figure 3:
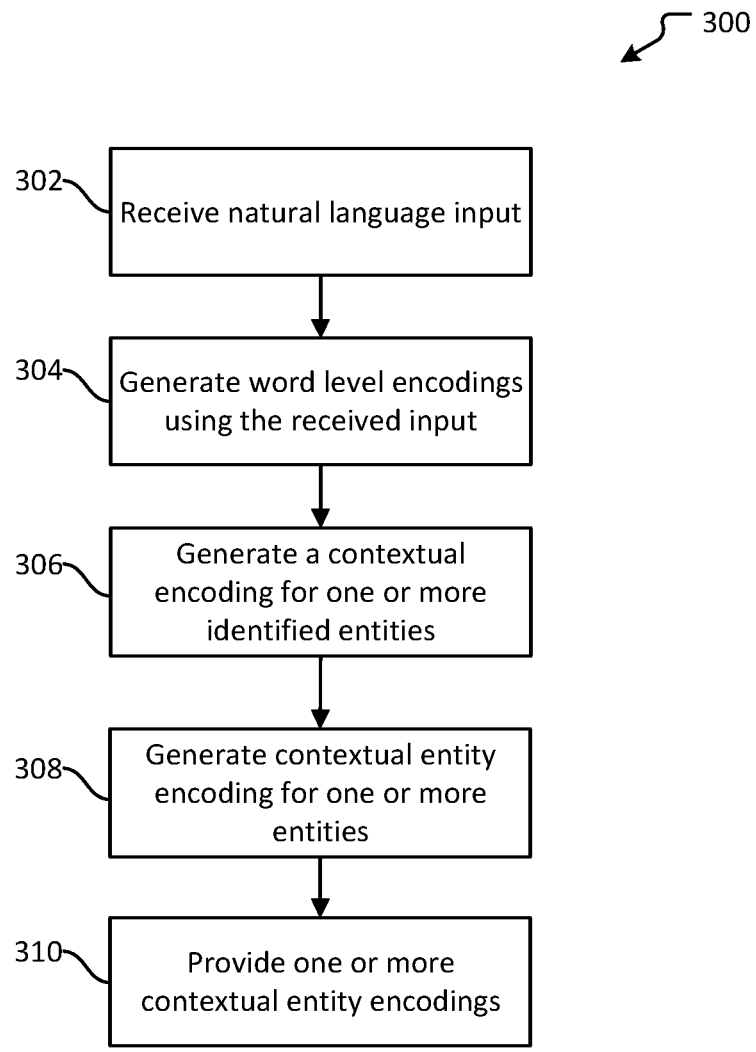
FIG. 3 depicts an exemplary method for generating a contextual encoding for one or more identified entities.

FIG. 3 depicts an exemplary method 300 for generating a contextual encoding for one or more identified entities. In as an example, the operations of method 300 may be performed by an input encoder and/or an attention engine, such as 108 and attention engine 110 of FIG. 1. Flow begins at operation 302 where natural language input is received. In certain aspects, the natural language input received at operation 302 may be the same input received by an entity encoder performing the method 200. Flow continues to operation 304 where an encoding is generated for the natural language input. In one example, each word of the natural language input may be processed using a sequence-to-sequence encoder to generate a set of word level encodings for the received natural language input. In an alternate example, character level encoding may be employed at operation 304. In still further aspects, a combination of character level and word level encoding may be used. One of skill in the art will appreciate that any type of encoding may be performed at operation 304 so long as the generated encodings are combinable or otherwise compatible with the type of encodings generated by a companion entity encoder.

Flow continues to operation 306 where one or more contextual encodings are generated for one or more identified entities. In certain aspects, the device performing the method 300 may have access to the entities identified by the entity encoder. At operation 306, a contextual encoding may be generated based at least upon the entity encodings, e.g., encodings generated by the method 200, and the word level encodings generated in operation 304. For example, for each identified entity encoding, operation 306 may determine a relation or connection of one or more word encodings generated at operation 304 to the identified entity encoding. Based upon the determination, a score or weight may be determined for the one or more words in the natural language input. The determined scores or weights of the one or more words may be combined to generate a contextual encoding of the natural language input relative to an identified entity. In examples, one or more contextual encodings may be generated at operation 306 to correspond to the one or more entity encodings generated by the method 200.

Upon generating a contextual encoding for the natural language input at operation 306, flow continues to operation 308 where a contextual entity encoding is generated. As noted above, a contextual encoding for the natural language input may be generated for the one or more entity encodings generated by the method 200. In this manner, a contextual encoding represents contextual information from the natural language input relevant to a particular entity. At operation 308, the entity encoding for the particular entity is combined with a corresponding contextual encoding to generate a contextual entity encoding. In one example, the two encodings may be combined by concatenating the entity encoding and the contextual encoding. Alternatively, the contextual entity encoding may be generated by combining the encodings using other processes, such as providing the two entities as input to a sequence-to-sequence encoder, performing vector operations, or any other process for combing encodings known to the art. In certain aspects, a contextual entity encoding is generated for each relevant entity identified in the natural language input. Upon generating the one or more contextual entity encodings, the one or more contextual entity encodings are provided at operation 310. For example, the contextual entity encodings could be provided to a scoring engine, an application that received the natural language input, or any other type of requestor.

As should be appreciated, the operations of the method 300 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Figure 4:
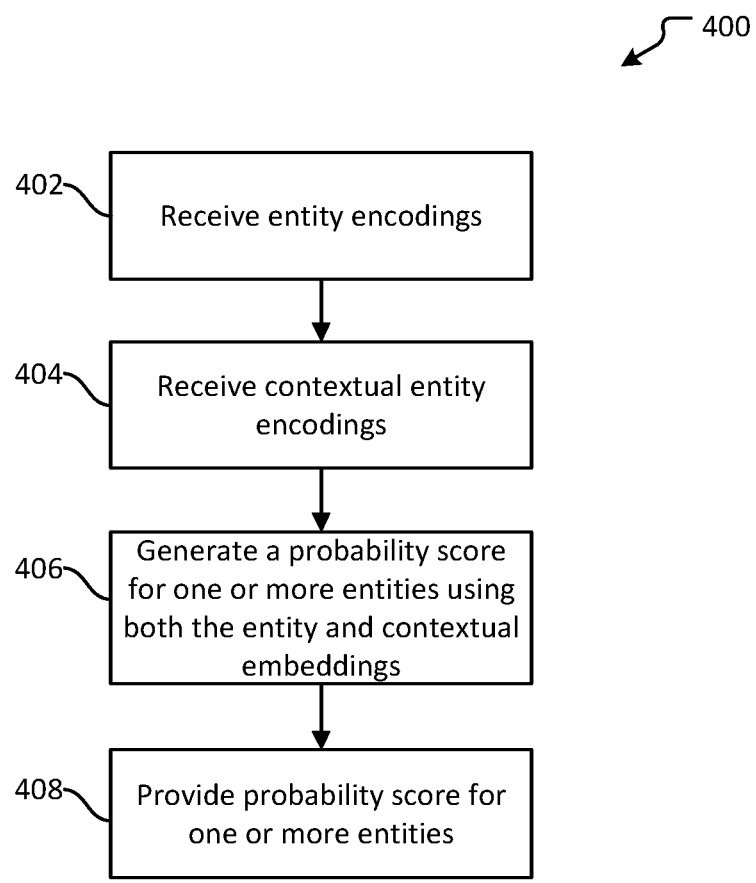
FIG. 4 is an exemplary method for generating a probability score for an identified entity.

FIG. 4 is an exemplary method 400 for generating a probability score for an identified entity. In as an example, the method 400 may be performed by a scoring engine, such as scoring engine 112 of FIG. 1. Flow begins at operation 402 where one or more entity encodings are received. As an example, the one or more received entity encodings may be received from an entity encoder, such as entity encoder 106 (FIG. 1) or from a process or device performing the method 200. The one or more entity encodings received at operation 402 represent the one or more relevant entities identified in a natural language input. The one or more relevant entities may be determined based upon their relevance to a task, such as the scheduling task used as an example previously. In addition to identify a relevant entity, an entity encoding received at operation 402 may have a confidence score indicating the entity's relevance. The confidence score may be determined when the entity encoding is generated.

At operation 404, one or more contextual entity encodings are received. As an example, the one or more contextual entity encodings may be received from the attention engine 110 (FIG. 1) or from a process or device performing the method 300. In certain aspects, a corresponding contextual entity encoding may be received for each entity encoding received in operation 402. At operation 406, a one or more probability scores are generated based upon the received entity encodings and contextual entity encodings. In one example, the entity encoding and the contextual entity encoding may be provides as input into a function, such as a sigmoid function, to determine a probability score. Using both allows the method to more accurately determine a probability indicated the entity's relevance to a task determinations based upon the individual encodings. In one example, a separate probability score may be generated for the entity encoding and the contextual entity encoding. These separate probability scores may be provided individually and/or may be used as input into a function to determine a final probability score based upon the two encodings. As noted above, the probability score generated at operation 406 represents the likelihood that an identified entity in the natural language input is relevant to a task to be performed. At operation 408, the probability scores for the one or more identified entities may be provided. For example, the probabilities and their associated identified entities may be provided to a requesting application or, as depicted in FIG. 1, may be provided to a negation constraint model.

As should be appreciated, the operations of the method 400 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Figure 5:
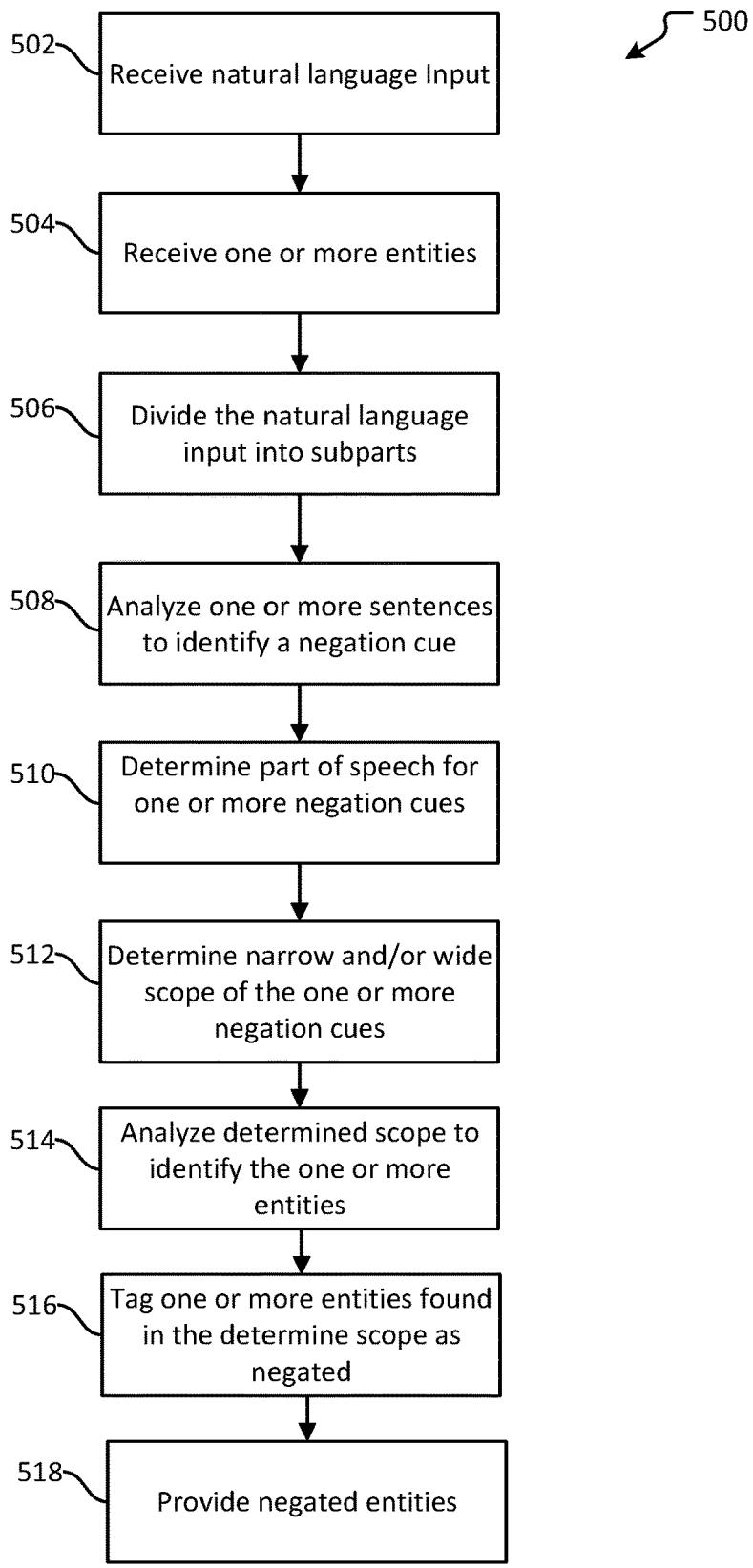
FIG. 5 depicts an exemplary method 500 for determining whether an identified entity is associated with a negation cue.

FIG. 5 depicts an exemplary method 500 for determining whether an identified entity is associated with a negation cue. As noted above, merely identifying entities relevant to a task may still result in incorrect performance of a task when an entity is negated. As such, once the relevant entities have been identified, optimal performance of a task may be obtained by performing further analysis on the natural language input to identify negation cues. Referring back to the example input of FIG. 1A, the entity "Wednesday" 140 would be identified as a relevant entity for task scheduling and likely would be associated with a high probability score. However, scheduling, by a scheduling application, a meeting on Wednesday would lead to an undesirable result. Flow begins at operation 502 where the natural language input is received. The natural language input received at operation 502 is the same input that was used to generate the entity encodings and contextual entity encodings described with respect to FIGS. 2 and 3. At operation 504, the one or more relevant identities are received. The received entities may be associated with a probability score, such as the probability score generated by the method 400. In one aspect, negation may be determined for each identified entity, even if the identified entity has a low probability score indicating that the entity is most likely not relevant to the task. Determining negation for the low probability entities provides information that, while not relevant to the task, may still be used to train the models disclosed herein to provide more accurate results in subsequent processing. Alternatively, negation may only be determined for entities meeting a certain probability threshold.

At operation 506, the natural language input is divided into subparts. In one aspect, the natural language input may be tokenized into sentences. However, one of skill in the art will appreciate that the size of the subparts could be larger or smaller than a sentence. For example, a subpart could be an entire paragraph, a page, a group of sentences, or a group of words. In examples, the individual subparts may be analyzed to identify negation cues at operation 508. In one example, each subpart may be parsed to identify known negation cues. Exemplary negation cues include, but are not limited to, words such as: "not," "never," "neither," "nor," "no," "nothing," "nobody," "instead of," "without," "rather than," "failed to," "avoid," "other than," "unable," "negative," "except," "none," and/or words ending with the contraction "n't." One of skill in the art will appreciate that, while specific negation cues are described herein, the specific negation cues are provided for exemplary purposes and other types of negation cues may be identified.

Upon identifying one or more negation cue, flow continues to operation 510. At operation 510, the part of speech for a negation cue is identified. For example, referring to the exemplary natural language input 115 (FIG. 1A), the word "except" would be identified as a negation cue. As the word "except" is used as a preposition in the provided example, the word "except" in the exemplary natural language input 115 will be tag as a preposition. Once the part of speech has been determined for an identified negation cue, the scope of the negation cue may be determined at operation 512. For example, a set of heuristics may be used to identify a negation scope. In certain examples, the heuristic analysis may identify the negation cue based upon a dependency parse of a sentence as well as the governor of the negating word. In certain aspects, multiple scopes may be determined for each identified negation cue. For example, generating narrow scope of negation (i.e., not containing the subject) may be performed by identifying a constituent from a constituency parse that contains both the negation cue and the governor word, e.g., "any day except Wednesday" in the exemplary natural language input 115. The identified constituent may be considered to be a candidate for the narrow scope. In such examples, the part of natural language input following the negation cue may be considered the narrow scope. However, in some cases, a narrow scope may not be enough to identify the entity being negated. Accordingly, a wide scope may also be determined using a heuristic analysis. In examples, the wide scope may be determined analyzing a dependency path starting from a governor word to identify a subject associated with the governor word. This portion of the sentence may be extracted as a wide scope. Exemplary heuristics that may be used to determine the wide scope include, but are not limited to:

If a noun phrase acting as an adverbial modifier acts as a subject to the governor, it is included in the wide scope.

If a noun phrase exits as a subject of a passive clause, the noun phrase is included in the wide cope as well as the passive auxiliary associated with it.

A prepositional phrase acting as a subject to a governor is included in a wide scope.

For a narrow scope, the subtree that exists as an object of an adverbial clause relation headed by the governor is removed from the narrow scope.

While specific rules for the heuristics analysis have been disclosed herein, one of skill in the art will appreciate that additional rules may be employed with the aspects disclosed herein without departing from the scope of this disclosure.

Upon determining the one or more scopes at operation 512, the words of the scopes are analyzed at operation 514 to determine if any of the identified entities received at operation 504 fall within a determined scope. In one example, a narrow scope may be analyzed first. If one of the identified entities is not found within the narrow scope of the negation cue, a wide scope may then be subsequently analyzed. Such ordering results in more efficient processing of the negation cue scopes. At operation 516, each identified entity found in a negation cue scope is tagged as negated. In certain examples, tagging an entity as negated does not change the probability score previously determined for the entity. Instead, tagging the entity identifies the entity as negated, which indicates that it should not be used to perform a task. At operation 514, the entities tagged as negated are provided to a requesting application. In such examples, all entities, including the non-negated entities are provided. Providing all entities provides the benefit of providing an application with additional information required to perform the task. However, in alternate examples the negated entities may be removed such that only the identified entities not tagged as negated are provided to the application.

As should be appreciated, the operations of the method 500 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Having described the machine learning models and processes used to identify relevant entities, capture contextual information related to the identified entities, and determining whether an identified entity is negated, use of these models to perform a task will now be described. The aspects disclosed herein may be utilized by any type of application that receives natural language input. For instance, the exemplary natural language input 115 of FIG. 1A is an email. The email may be received by a personal information manager, a calendar application, or a scheduling application to determine a meeting time for "W." and "S. H." Other types of application may also leverage the aspects disclosed herein. For example, a search engine or file browser may receive natural language input related to a search that includes a negation cue. A personal digital assistant performing a task for user may receive a natural language input command from a user that includes a negation cue. Indeed, one of skill in the art will appreciate the broad applicability of the aspects disclosed herein to any type of application capable of receiving natural language input.

Figure 6:
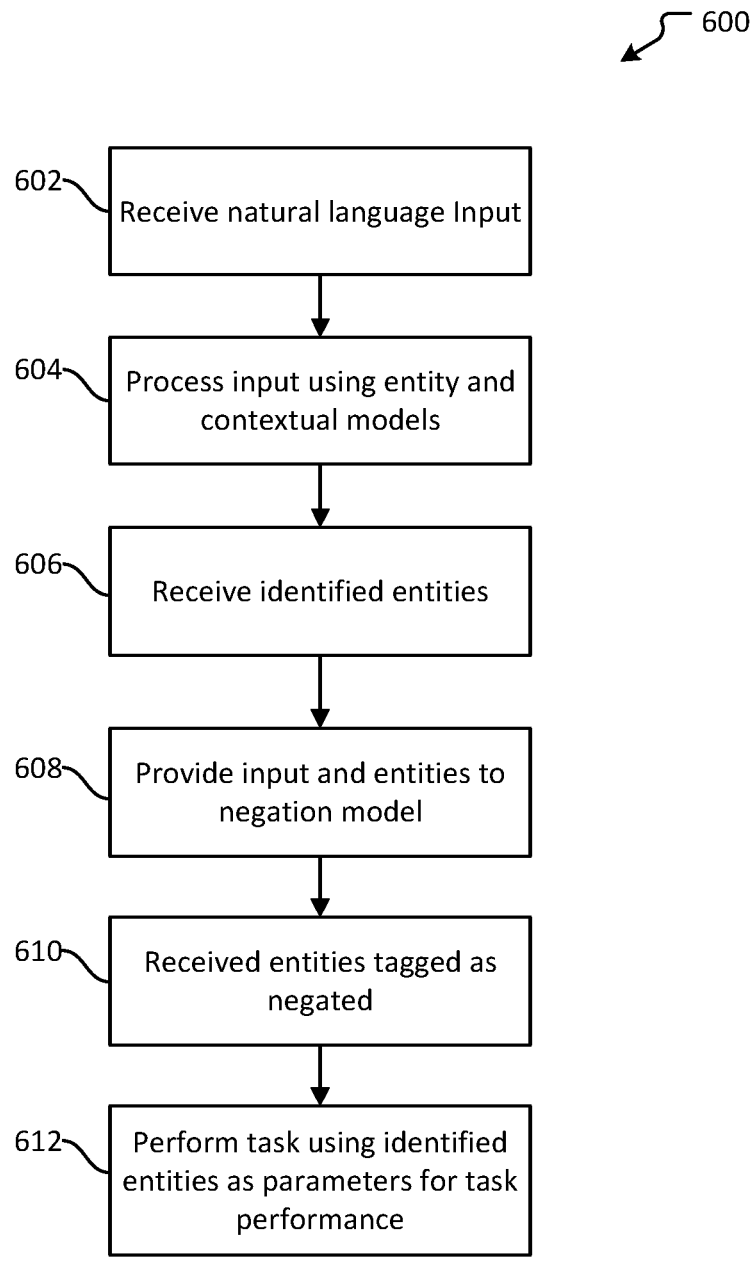
FIG. 6 depicts an exemplary method 600 for performing a task in response to receiving natural language input.

FIG. 6 depicts an exemplary method 600 for performing a task in response to receiving natural language input. Flow begins at operation 602 where natural language input is received by an application. In some aspect, analysis of the natural language input may be performed to determine if the received input is related to a specific task. In still further aspects, upon receipt of the natural language input, the application may preprocess the natural language input to transform it into a representation that can be provided to a machine learning process or neural network. At operation 604, the natural language input is processed using one or more models, such as the models depicted in system 100 of FIG. 1. At operation 606, the one or more identified entities may be received identified using the one or more models may be received. At operation 606, the one or more identified entities are provided to a negation model to determine if any of the entities are associated with a negation cue. In one example, only entities meeting a threshold probability may be provided to the negation model. However, in alternate aspects all of the identified entities may be provided to the negation model for processing. At operation 610, in response to processing the negation model, the device performing the method 600 may receive a subset of the entities tagged as negated. While the method 600 describes separate operations for receiving the identified entities and the entities tagged as negated, in an alternate aspect the device performing the method 500 may receive both the identified and tagged entities at the same time. Finally, upon receiving both the identified entities and the entities tagged as negated, the application can perform a task using the entities as parameters for task completion. For example, the application performing the task would select the entities having the highest probability score as being related to the task as parameters for performing the task while omitting the entities identified as being negated as a correct parameter to complete the task. In this manner, an application receiving the natural language input is able to more accurately perform a task in response based upon the input. This further provides the benefit of an enhanced user experience by more accurately performing the task while requiring less interaction with the user to collect and/or confirm the parameters required for the task. This in turn reduces the amount of processing and network resources needed to perform the task which provides other benefits, such as reduced power consumption and bandwidth usage.

As should be appreciated, the operations of the method 400 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Figure 7:
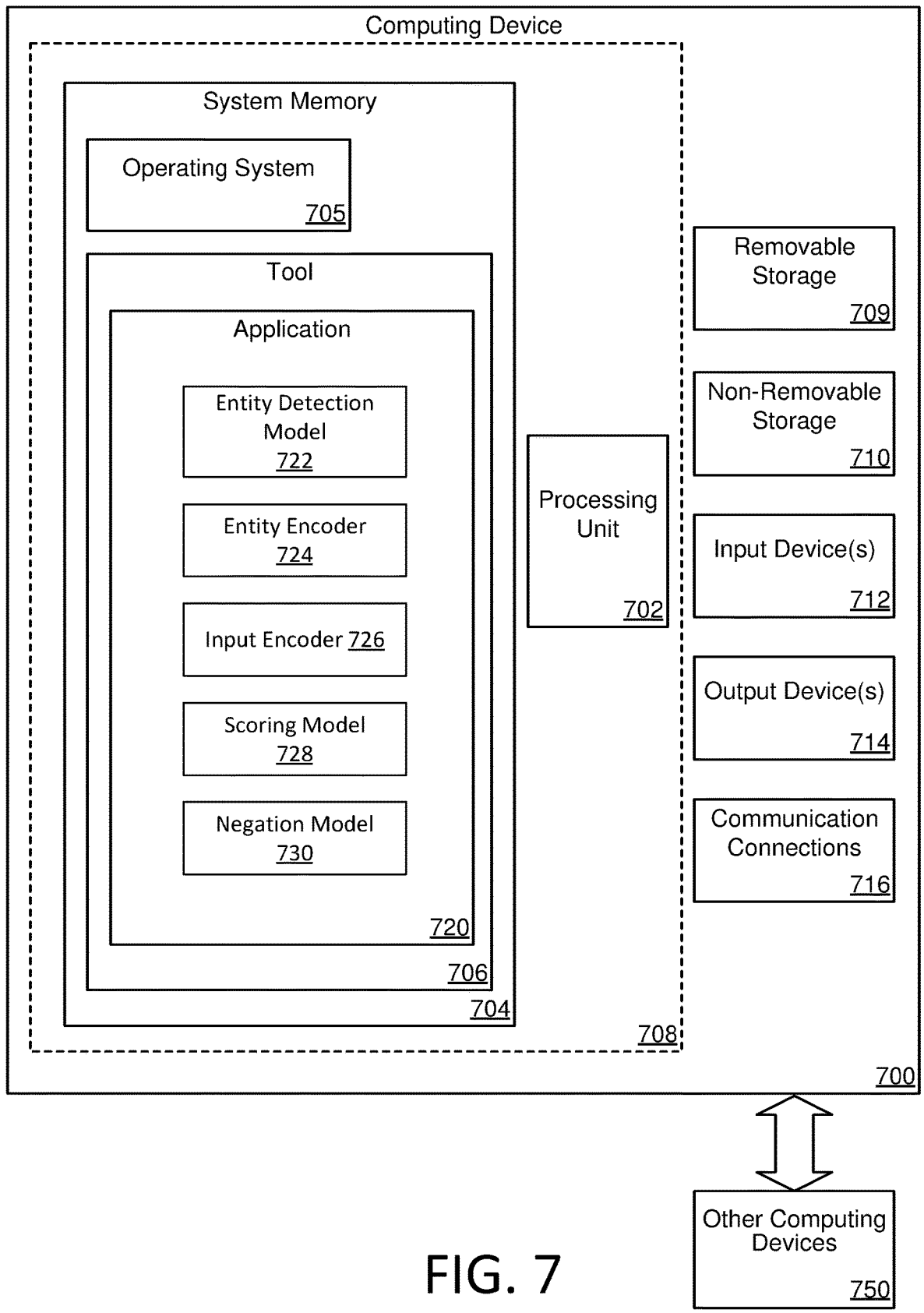
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the processing unit 702, the program tools 706 (e.g., application 720) may perform processes including, but not limited to, the aspects, as described herein. The data distribution application 720 includes may an entity detection model 722, an entity encoder 724, an input encoder 726, a scoring engine 728, a negation model 730, as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, file browsers, search engines, personal digital assistants, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
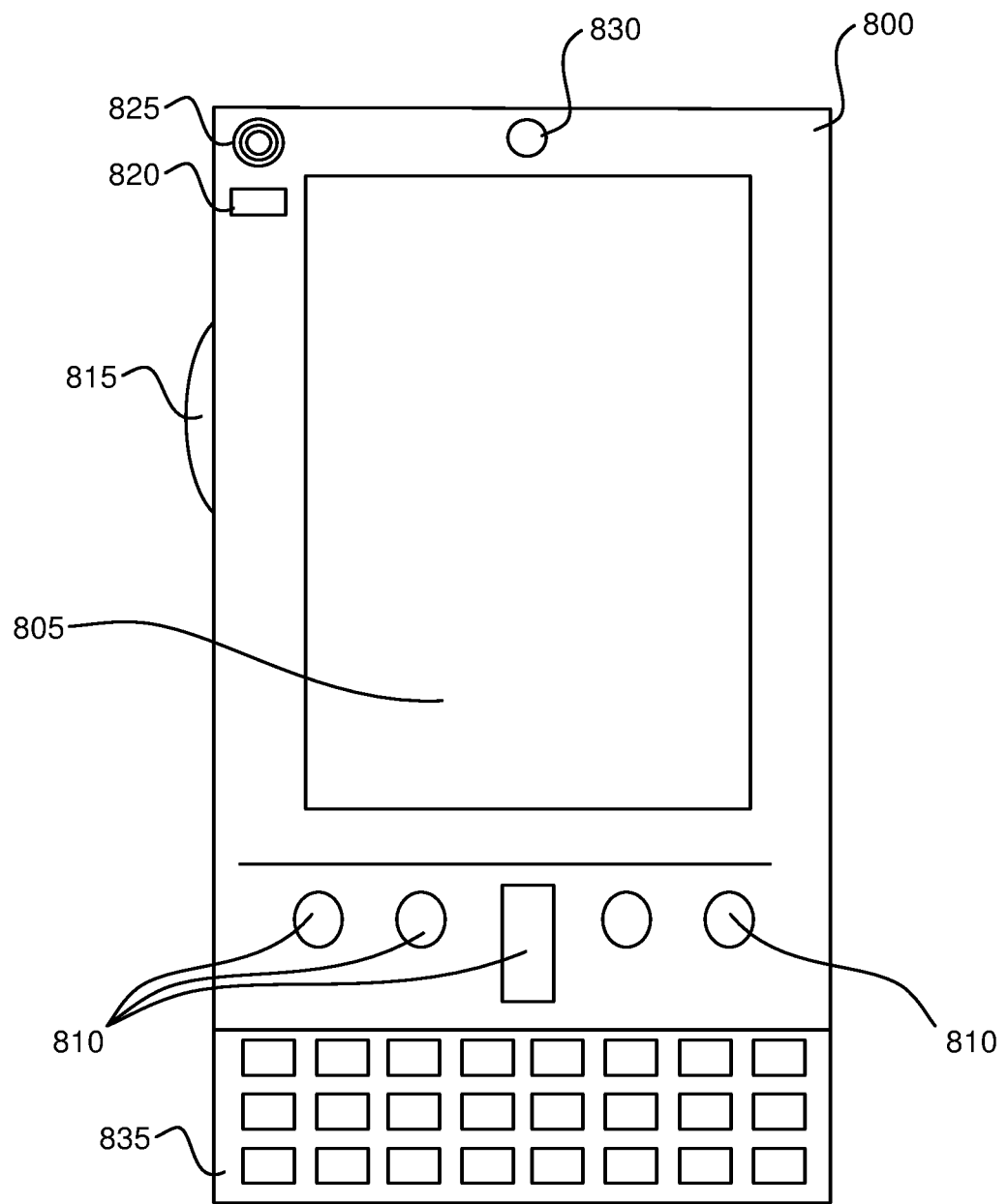
FIG. 8A is a simplified diagram of a mobile computing device with which aspects of the present disclosure may be practiced.
Figure 8B:
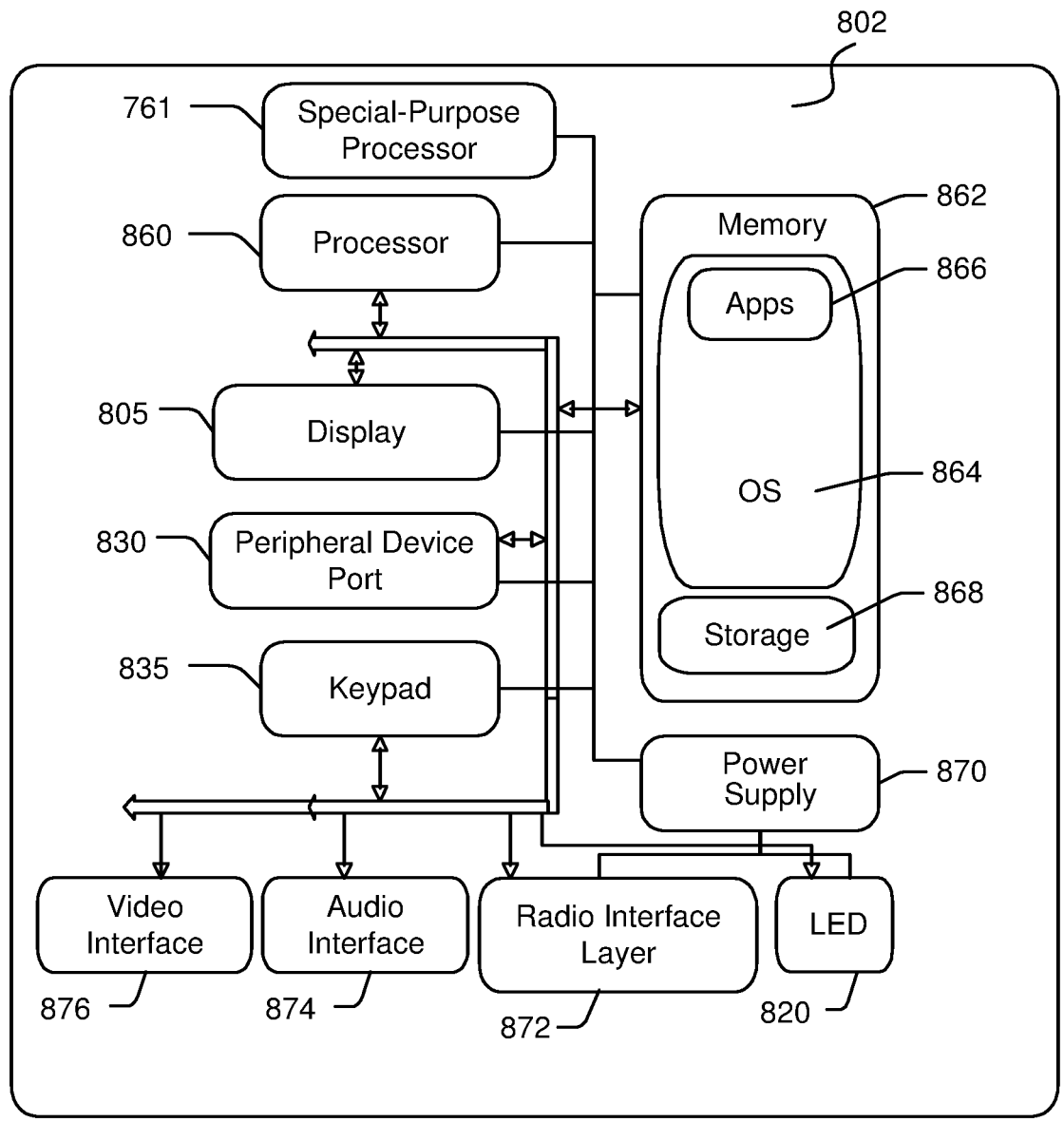
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., user of client device A 102A and user of client device B 102B in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., web server 102, web search server 114, and copy generator 120 in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method comprising:
receiving a natural language input;
determining, using an entity encoder, one or more entities relevant to a task associated with the natural language input, the one or more entities comprising a first entity encoding;
determining, using an input encoder, one or more contextual encodings based upon the natural language input, the one or more contextual encodings comprising at least a first contextual encoding;
generating one or more contextual entity encodings based at least upon the one or more entities and one or more contextual encodings, wherein the one or more contextual entity encoding comprises at least a first contextual entity encoding, the first contextual entity encoding corresponding to the first entity;
determining one or more probability scores for the one or more entities, the probability scores representing a relevance of a particular entity of the one or more entities to the task associated with the natural language input, wherein determining the probability comprises:
determining a first probability for a first entity, wherein the first probability is determined based upon the first entity encoding and the first contextual entity encoding; and
providing the one or more entities and the one or more probability scores to a negation constraint model, wherein the one or more probability scores are generated based on the first entity encoding and the one or more contextual entity encoding,
determining whether an entity of the one or more entities is associated with a negation cue based upon the natural language input, wherein determining whether an entity of the one or more entities is associated with a negation cue comprises:
tokenizing the natural language input into one or more sentences;
analyzing the one or more sentences to identify the negation cue;
when the negation cue is identified, determining a scope for the negation cue, wherein determining the scope of the negation cue comprises:
determining a narrow scope for the negation cue by identifying a constituent of a constituent parse that contains both the negation cue and a governor word; and
determining a wide scope for the negation cue, and when the entity is within the scope of the negation cue, tagging the entity as negated; and
providing the one or more entities.

2. The method of claim 1, wherein generating the first contextual entity encoding comprises concatenating the first entity encoding and the first contextual encoding.

3. The method of claim 2, wherein the first contextual encoding corresponds to the first entity, and wherein the first contextual encoding represents contextual information related to the first entity.

4. The method of claim 1, further comprising, when the entity is within the scope of the negation cue, tagging the entity as negated.

5. The method of claim 1, wherein determining a wide scope comprises analyzing a dependency path starting from a governor word to identify a subject associated with the governor word.

6. The method of claim 5, further comprising, when the entity is in the dependency path, tagging the entity as negated.

7. The method of claim 1, wherein identifying the negation cue further comprises performing a dependency parse of a sentence of the one or more sentences.

8. The method of claim 7, wherein identifying the negation cue further comprises performing a dependency parse of the governor word.

9. The method of claim 1, wherein determining the wide scope comprises analyzing a dependency path starting from the governor word to identify a subject associated with the governor word.

10. The method of claim 1, wherein tagging the entity as negated does not change the one or more probability scores previously determined for the entity.

11. The method of claim 1, wherein the entity tagged as negated is removed from the one or more entities.

12. A computer storage medium encoding computer executable instructions that, when executed by at least one processor, perform a method comprising:
receiving a natural language input;
determining, using an entity encoder, one or more entities relevant to a task associated with the natural language input, the one or more entities comprising a first entity encoding;
determining, using an input encoder, one or more contextual encodings based upon the natural language input, the one or more contextual encodings comprising at least a first contextual encoding;
generating one or more contextual entity encodings based at least upon the one or more entities and one or more contextual encodings, wherein the one or more contextual entity encoding comprises at least a first contextual entity encoding, the first contextual entity encoding corresponding to the first entity;
determining one or more probability scores for the one or more entities, the probability scores representing a relevance of a particular entity of the one or more entities to the task associated with the natural language input, wherein determining the probability comprises:
determining a first probability for a first entity, wherein the first probability is determined based upon the first entity encoding and the first contextual entity encoding;
determining whether an entity of the one or more entities is associated with a negation cue based upon the natural language input;
when the entity is associated with a negation cue, tagging the entity as negated; and
providing the one or more entities and the one or more probability scores to a negation constraint model, wherein
the one or more probability scores are generated based on the first entity encoding and the one or more contextual entity encodings,
determining whether an entity of the one or more entities is associated with a negation cue based upon the natural language input, wherein determining whether an entity of the one or more entities is associated with a negation cue comprises:
tokenizing the natural language input into one or more sentences;

analyzing the one or more sentences to identify the negation cue;

when the negation cue is identified, determining a scope for the negation cue, wherein determining the scope of the negation cue comprises:

determining a narrow scope for the negation cue by identifying a constituent of a constituent parse that contains both the negation cue and a governor word; and determining a wide scope for the negation cue, and when the entity is within the scope of the negation cue, tagging the entity as negated; and providing the one or more entities.

13. The computer storage medium of claim 12, wherein determining whether the entity is associated with the negation cue comprises:

tokenizing the natural language input into one or more sentences;

analyzing the one or more sentences to identify the negation cue;

when the negation cue is identified, determining a scope for the negation cue; and determining whether the entity is within the scope for the negation cue.

14. A system comprising:

at least one processor; and memory, encoding computer executable instructions that, when executed by the at least one processor, cause the at least one processor to:

receive a natural language input;

determine, using an entity encoder, one or more entities relevant to a task associated with the natural language input, the one or more entities comprising a first entity encoding;

determine, using an input encoder, one or more contextual encodings based upon the natural language input, the one or more contextual encodings comprising at least a first contextual encoding;

generate one or more contextual entity encodings based at least upon the one or more entities and one or more contextual encodings, wherein the one or more contextual entity encoding comprises at least a first contextual entity encoding, the first contextual entity encoding corresponding to the first entity;

determine one or more probability scores for the one or more entities, the probability scores representing a relevance of a particular entity of the one or more entities to the task associated with the natural language input, wherein determining the probability comprises:

determine a first probability for a first entity, wherein the first probability is determined based upon the first entity encoding and the first contextual entity encoding; and provide the one or more entities and the one or more probability scores to a negation constraint model, wherein the one or more probability scores are generated based on the first entity encoding and the one or more contextual entity encoding;

determine whether an entity of the one or more entities is associated with a negation cue based upon the natural language input, wherein determining whether an entity of the one or more entities is associated with a negation cue comprises:

tokenizing the natural language input into one or more sentences;

analyzing the one or more sentences to identify the negation cue;

when the negation cue is identified, determining a scope for the negation cue, wherein determining the scope of the negation cue comprises:

determining a narrow scope for the negation cue by identifying a constituent of a constituent parse that contains both the negation cue and a governor word; and determining a wide scope for the negation cue, and when the entity is within the scope of the negation cue, tagging the entity as negated; and provide the one or more entities.

15. The system of claim 14, wherein entity encoder further comprising:

identifying a relevant entity in the natural input;

generating a word level encoding of the relevant entity;

generating a character level encoding of the relevant entity; and generating an encoded entity based upon the word level encoding and the character level encoding.

16. The system of claim 15, wherein the entity encoder further comprising:

combining the word level encoding and the character level encoding into a combined encoding; and passing the combined encoding to a sequence-to-sequence encoder to generate a final entity encoding.

17. The system of claim 14, wherein generating the first contextual entity encoding comprising concatenating the first entity encoding and the first contextual encoding.

18. The system of claim 14, wherein the first contextual encoding corresponds to the first entity, and wherein the first contextual encoding represents contextual information related to the first entity.

19. The system of claim 14, further comprising, when the entity is within the scope of the negation cue, tagging the entity as negated.

20. The system of claim 14 wherein determining a wide scope comprises analyzing a dependency path starting from a governor word to identify a subject associated with the governor word.

* * * * *